United States Patent [19]

Conrad et al.

[11] Patent Number: 5,016,500

[45] Date of Patent: May 21, 1991

[54] BATTERY POWERED TEMPERATURE-CONTROLLED WIRE STRIPPER

[75] Inventors: Alta Conrad, Vista, Calif.; George E. Mayer, Pittsburgh, Pa.; Donald A. Utke, Carlsbad, Calif.

[73] Assignee: Teledyne Kinetics, Solana Beach, Calif.

[21] Appl. No.: 508,194

[22] Filed: Apr. 10, 1990

[51] Int. Cl.$^5$ .............................................. H02G 1/12
[52] U.S. Cl. ..................................... 81/9.4; 219/233; 219/240
[58] Field of Search .................. 81/9.4, 9.51; 219/221, 219/227, 229, 233, 240, 241; 30/140

[56] References Cited

U.S. PATENT DOCUMENTS

| | | | |
|---|---|---|---|
| 3,667,328 | 6/1972 | Stolshek | 81/9.4 |
| 3,711,677 | 1/1973 | Cummins | 219/233 |
| 4,650,961 | 3/1987 | Nespor | 81/9.4 |

Primary Examiner—Roscoe V. Parker
Attorney, Agent, or Firm—Nydegger & Associates

[57] ABSTRACT

A portable thermal wire stripper has a pair of heatable stripping blades which are electrically attached to an electrical power and control system. The electrical system converts a direct current output from a battery which is housed in the wire stripper into a variable alternating current power which is used for controlling the surface temperature of the heated blades.

26 Claims, 3 Drawing Sheets

BATTERY POWERED TEMPERATURE-CONTROLLED WIRE STRIPPER

FIELD OF THE INVENTION

The present invention relates generally to devices which are useful for stripping insulation from wires. More particularly, the present invention relates to a battery operated portable device with a temperature control feature for stripping various types of insulation from wires. This invention is particularly, though not exclusively, useful for thermally stripping insulation from wires located in areas which are relatively inaccessible or are remote from electrical power outlets.

BACKGROUND OF THE INVENTION

A well known method of removing insulation from wire or cable is to heat, and thereby partially melt, the insulation at a point on the wire near the area of insulation to be removed. This heating weakens the insulation and permits the insulation to be easily gripped and stripped from the wire or cable core without crimping, gouging or deforming the core, as commonly occurs with mechanical wire stripping. As can be readily appreciated, the temperature required to melt the insulation to permit stripping the insulation varies with insulator type and thickness. It is therefore desirable that a thermal stripping device be capable of operating at various temperatures. As can be further appreciated, a single-temperature stripping device may be adequate for some applications, but inadequate for others. For example, a device designed with a single, relatively low stripping element operating temperature for stripping relatively thin insulation, or insulation having a low melting point, may be inadequate for stripping thicker insulation, or insulation having a relatively high melting point. Conversely, a thermal wire stripper designed with a single, relatively high operating temperature for stripping insulation requiring high stripping temperatures will unnecessarily dissipate excess energy when used to strip thinner insulator material and may char the insulation. Indeed, it may even melt the wire itself. For these reasons, it is desirable that thermal wire stripping devices be designed to operate with variable stripping element temperatures.

To satisfy this requirement, many prior thermal stripping devices have been designed to permit heating the stripping elements to more than one operating temperature. A majority of these devices, however, have typically required the use of an alternating current power supply to heat the stripping elements. This power requirement has tended to make existing devices somewhat cumbersome to use, because a power cable from the alternating current power source must be attached to the device to energize it. This can be burdensome and, consequently, alternating current power stripping devices are not easily used in relatively inaccessible locations or in locations which are remote from an alternating current power supply.

To ameliorate the portability and accessibility problems normally associated with alternating current power, as noted above, direct current batteries have sometimes been used as power supplies for thermal stripping devices The single voltage output of direct current batteries, however, has limited the operation of these devices to a single temperature.

As can be appreciated from the foregoing discussion, it would be desirable to provide a thermal wire stripper which is powered by a relatively compact, portable direct current battery, yet which still permits the use of a wide range of stripping element temperatures. In view of the above, it is an object of the present invention to provide a thermal wire stripper which may be used to strip insulation of various types and thicknesses from wire or cable. It is a further object of the present invention to provide a thermal wire stripper which will accomplish the above for a wide range of insulation thicknesses and types without dissipating excess energy. Another object of the present invention is to provide a thermal wire stripper which is portable, yet capable of generating sufficient heat to strip insulation having a relatively high melting point. Still another object of the present invention is to provide a thermal wire stripper which is simple to use, easy to manufacture and relatively cost-effective.

SUMMARY OF THE INVENTION

A preferred embodiment of the present invention includes a portable device for thermally stripping insulation from wires which comprises two stripping blades and associated electrical circuitry for heating the blades and controlling the temperature of the blades. The device uses a direct current power supply which may be installed within the casing of the stripping device, and the electrical circuitry of the device generates a square wave control signal from this direct current power supply. A potentiometer is installed in a timer to vary the duty cycle of the square wave generator. A flip-flop oscillator is used to convert the positive portion of the square wave control signal from the timer into a two-phase switching signal, the phases of which are 180° out of phase with each other. These two switching signal phases are then transmitted to a pair of field effect transistors, which act as switches that permit direct current from the power supply to flow through the primary windings of a center tap transformer when the transistors are activated by the switching signal from the oscillator. More specifically, one of the field effect transistors is switched on during the positive phase of the switching signal. This transistor consequently completes the electrical circuit from the power supply to ground through the first half of the primary winding of the center tap transformer. Additionally, the second field effect transistor is switched on during the negative phase of the switching signal from the oscillator. Accordingly, the second transistor completes the electrical circuit from the power supply to ground through the second half of the primary winding of the center tap transformer. The transformer's two secondary windings are in turn connected to respective stripping blades for heating the blades. The temperature of the stripping blades is proportional to the duty cycle of the square wave generator, which the operator may adjust by varying the potentiometer as described above.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
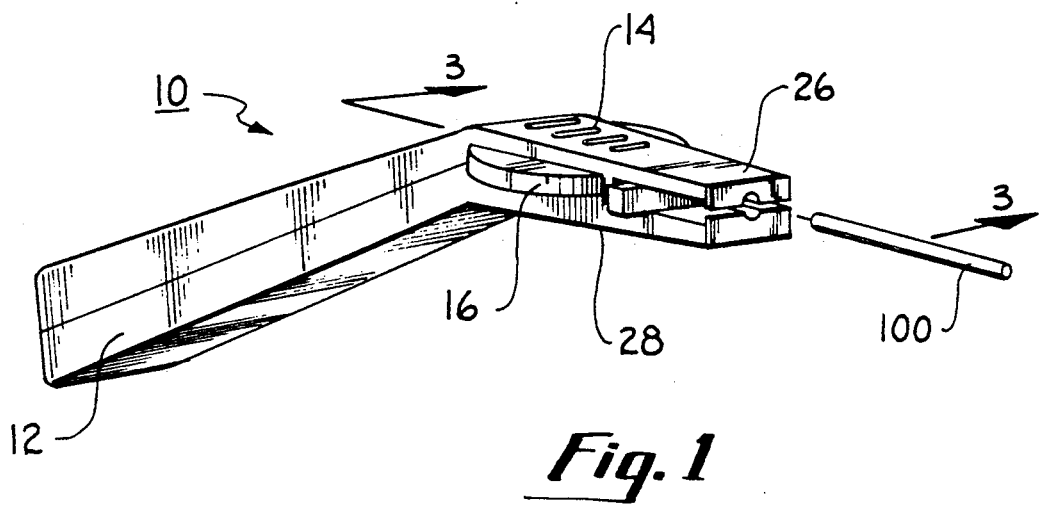
FIG. 1 is a perspective view of the preferred embodiment of the thermal wire stripper.

As shown in FIG. 1, a thermal wire stripper, generally designated 10, comprises an outer case 12 for supporting the various components of thermal stripper 10. Outer case 12 is preferably composed of an insulating material, such as plastic, and may be formed with a handgrip 14. As intended for the present invention, thermal wire stripper 10 is used to remove the outer insulative layer of wire 100.

Figure 2:
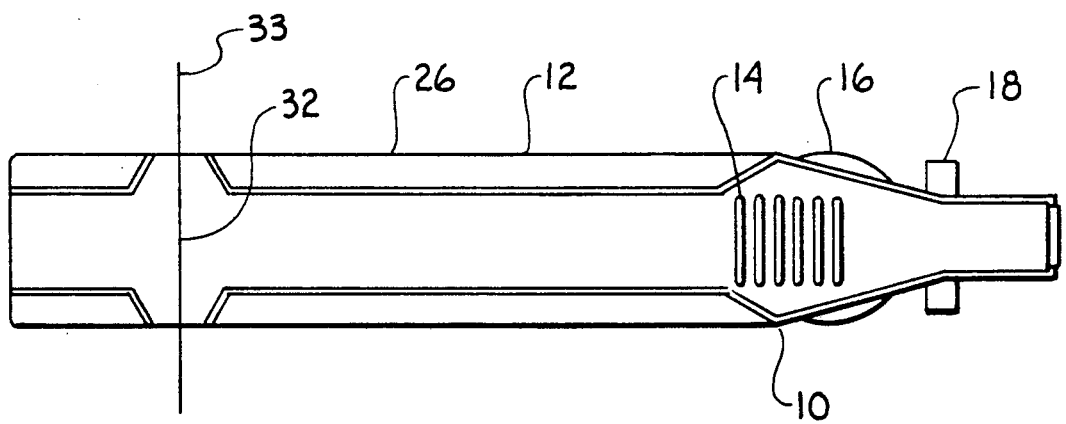
FIG. 2 is a top view of a preferred embodiment of the thermal wire stripper of the present invention.
Figure 3:
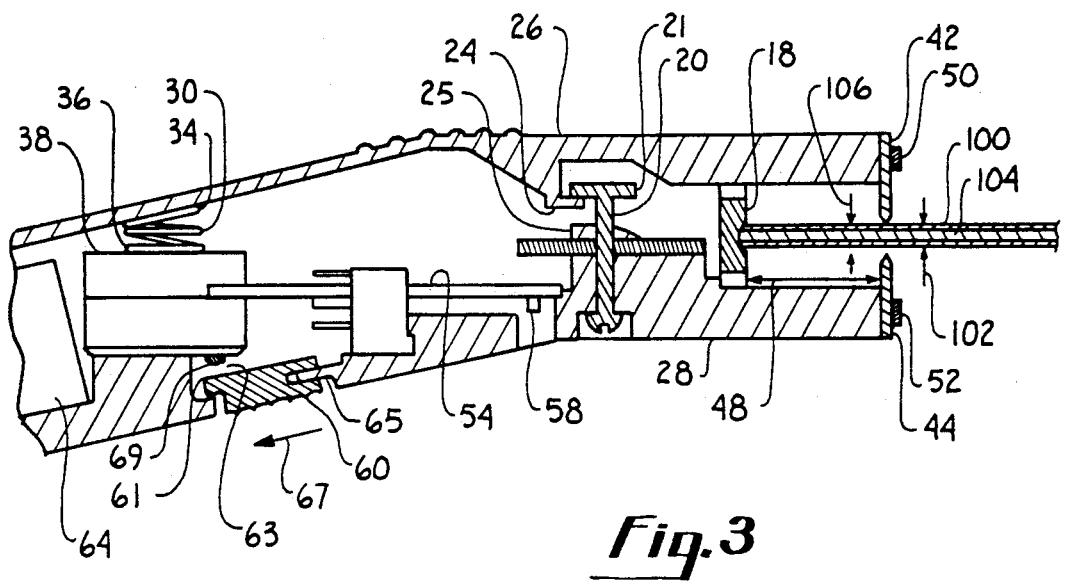
FIG. 3 is an enlarged cut-away side cross-sectional view of the thermal wire stripper, as seen along the line 3—3 in FIG. 1, with portions broken away for clarity, showing the relative location of the internal components of the thermal wire stripper.

As can be seen by cross-referencing FIGS. 2 and 3, an upper blade support 26 of outer case 12 is hingedly connected to a lower blade support 28 at hinge 32 by any suitable hinging means. Hinge 32 may comprise any hinging device well-known in the art which allows upper support 26 and lower support 28 to pivot at hinge 32 about pivot axis 33, which is located on stripper 10 as generally shown in FIG. 2. To provide a further connection between upper support 26 and lower support 28, a spring 30, shown in FIG. 3, is fixedly attached in compression between upper blade support 26 and lower blade support 28. Specifically, end 34 of spring 30 contacts upper blade support 26 and is fixedly attached at its other end 36 to transformer housing 38, which is itself fixedly mounted in turn on lower blade support 28. It will be readily appreciated that when spring 30 is mounted in compression as described, spring 30 tends to pivot lower support 28 and upper support 26 away from each other about hinge axis 33 on the side of axis 33 where spring 30 is located. As can be seen in FIG. 3, the effect spring 30 has when so mounted is limited by the force of a shaft 20, which is fixedly attached to lower support 28. Specifically, cap 21 of shaft 20 contacts lip 24 of upper support 26, as shown in FIG. 3, thus preventing the compressive force of spring 30 from forcing supports 26 and 28 farther away from each other. In addition, an inclined ramp 25 is formed around shaft 20, which is in turn fixedly engaged with a gage stop 16. Because gage stop 16 is rotatably mounted on lower support 28, a rotation of gage stop 16 will cause shaft 20 and, thus, ramp 25 to rotate, to vary the distance between lip 24 and ramp 25. Accordingly, as seen in FIG. 3, the distance that supports 26 and 28 can be moved toward each other determines the separation distance 106 that can be established between blades 42 and 44. Thus, rotating gage stop 16 establishes the gage of wire 100 to be stripped.

Figure 6:
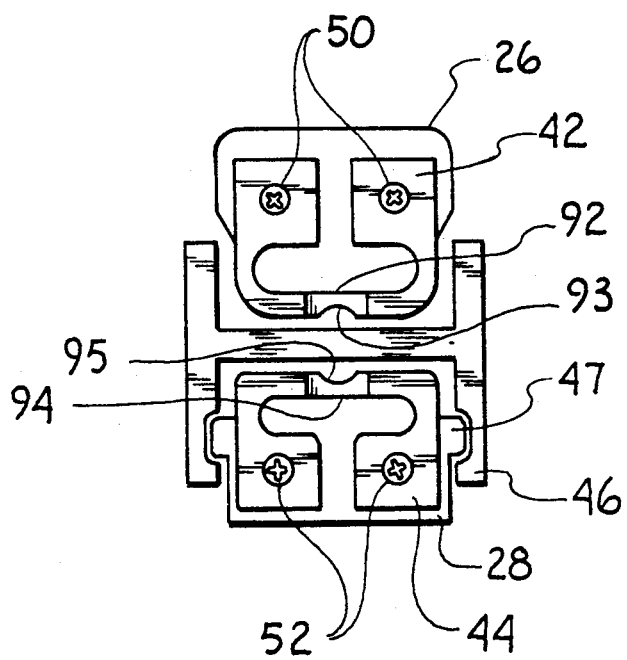
FIG. 6 is a front end view of the thermal wire stripper.

Still referring to FIG. 3, it is to be appreciated that strip stop 18 is slidably engaged with lower support 28. Referring briefly to FIG. 6, it will be seen that lip 46 of strip stop 18 forms an interference fit with lip 47 of lower support 28. It will therefore be appreciated by those skilled in the art that the length 48 of wire 100 to be stripped, as shown in FIG. 3, may be adjusted by sliding strip stop 18 along lower support 28.

Figure 7:
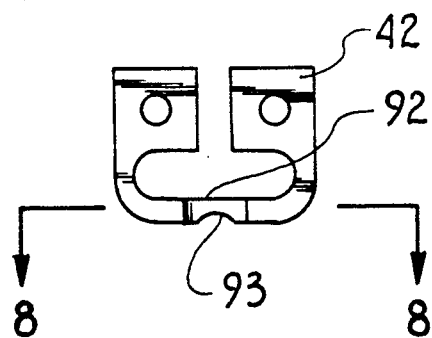
FIG. 7 is a front view of one blade of the thermal wire stripper.
Figure 8:
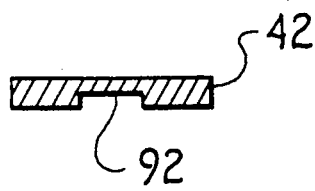
FIG. 8 is a cross-sectional view of one blade of the thermal wire stripper as seen along the line 8—8 in FIG. 7.

As further shown in FIGS. 3 and 6, blades 42 and 44 are seen fixedly attached to blade supports 26 and 28 by screws 50 and 52, respectively, although any suitable attachment means may be used. Blades 42 and 44 are composed of an electrically resistive material (for generating heat) which is selected to retain its structural strength at the relatively high temperatures used for thermal wire stripping. Blades 42 and 44 should also be designed to heat up relatively rapidly in response to the appropriate control signal, while dissipating as little thermal energy as possible from blade areas not in direct contact with the insulation to be stripped. In the embodiment shown in FIGS. 7 and 8 for a single exemplary blade 42, this concentration of heat is accomplished by forming necked areas 92 and 94 on the stripping surfaces of blades 42 and 44, respectively. As seen for blade 42 in FIG. 8, necked area 92 is smaller in cross section than the other areas of the blade 42. Additionally, FIG. 7 shows a notch 93 which may be formed on blade 42 for the purpose of guiding the wire to be stripped into contact with the necked area 92. A notch 95 (shown in FIG. 6), which is similar to the notch 93 may be also formed on blade 44 for this same purpose. It will be appreciated by the skilled artisan that by constructing blades 42, 44 as described above, the energy required to strip insulation from wire 100 (shown in FIG. 3) is consequently concentrated. By so concentrating this stripping energy, a greater number of stripping operations may be performed before any recharging or replacement of battery 64 is required.

Figure 4:
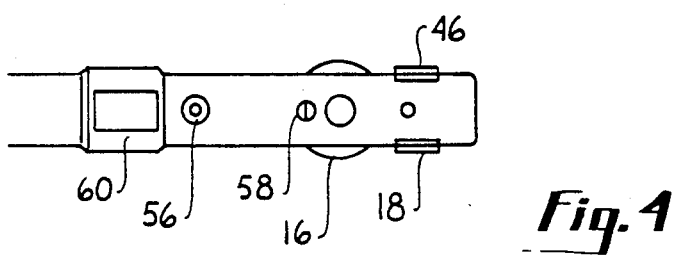
FIG. 4 is a bottom view of the operator control section of the thermal wire stripper.

An electrical circuit board 54 is shown in FIG. 3 to be fixedly mounted with a standard battery charging jack 56, to lower support 28. Electrical circuit board 54 mounts the electrical control components of thermal stripper 10, the functions of which are more fully discussed below. Also shown in contact with electrical circuit board 54 is potentiometer adjusting means 58. Adjusting means 58 is rotatably mounted on a potentiometer 68 (not shown in FIG. 3) by any means well known in the art and contacts circuit board 54 for operation to be more fully discussed below. Switch cover 60 is slidably and rotatably attached to lower support 28 and, as shown in FIG. 3, is located between blades 44, 42 and a battery 64. As discussed below in conjunction with the description of FIG. 5, switch cover 60 operates a switch 69 to initiate operation of thermal stripper 10. Battery 64 is removably mounted in case 12 and may be of any capacity that will provide power sufficient to adequately heat blades 42 and 44. Battery 64, however, should also be sized to be as compact as practicable. The preferred embodiment of thermal stripper 10 contemplates the use of eight type AA direct current batteries. Moreover, it will be appreciated that because the electronic control components of wire stripper 10, as disclosed below, require relatively little power, switch 62 may therefore comprise any relatively small switching device which is commercially available. Operator controls for thermal stripper 10 are best seen in FIG. 4. There it is seen that a battery charging jack 56 provides for an electrical connection through lower support 28 between a battery charger (not shown) and battery 64.

In the operation of thermal stripper 10, gage stop 16 is rotated to adjust distance 106 as appropriate for the gage of wire 100 to be stripped. Specifically, gage stop 16 is adjusted such that the distance 106 between blades 42 and 44 is marginally greater than the diameter 102 of conductor 104. Strip stop 18 is then slidably adjusted along blade support 28 as appropriate for the length 48 of wire segment to be stripped of insulation and the wire to be stripped of insulation is placed between blades 42 and 44. To heat blades 42 and 44 for stripping, the switch cover 60 is slidably moved along lower support 28 in the direction of arrow 67. Then, end 61 of cover 60 is depressed into cavity 63, which allows cover 60 to pivot on lip 65 of lower support 28, thereby urging end 61 against switch 69 to close contacts 62.

Figure 5:
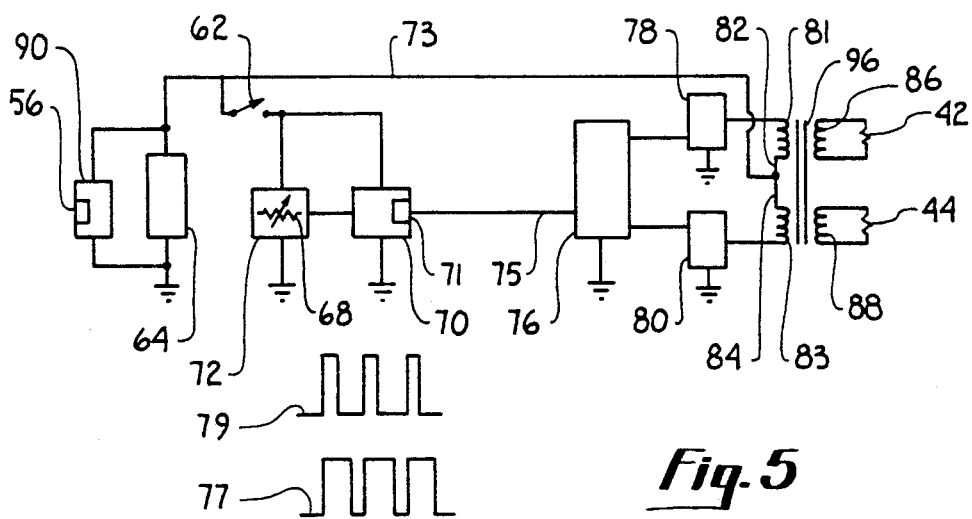
FIG. 5 is an electrical block diagram of the electrical circuitry of the thermal wire stripper.

Referring now to FIG. 5, it may be seen that when switch 62 is closed, battery 64 is electrically connected to a low voltage detector 70 and timer 72. Low voltage detector 70 senses the voltage from battery 64 and interrupts the electrical path between battery 64 and blades 42 and 44 whenever there is insufficient voltage to properly operate stripper 10. Specifically, this interruption is accomplished by deactivating gate 71 to interrupt the electrical path between the oscillator 76 and timer 72. Conversely, when the voltage of battery 64 is sufficiently high, low voltage detector 70 activates gate 71 to pass current to the rest of the control circuit components through line 75. In the preferred embodiment, low voltage detector 70 interrupts the electrical path between battery 64 and blades 42 and 44 when battery 64 voltage drops below eight and one-half (8.5) volts direct current. For the purposes of the present invention, low voltage detector 70 may comprise any suitable low voltage device well known in the art. Furthermore, as the skilled artisan will appreciate, low voltage detector 70, like the other electrical components of thermal stripping device 10 described below, may have a plurality of electrical connections, ground connections, and elementary component connections, such as resistors or capacitors, as required, to comprise a complete electrical circuit which is effective for the purposes of the present invention.

When voltage of battery 64 is sufficiently high, low voltage detector 70 activates gate 71 to permit the square wave generated by timer 72 to drive oscillator 76 through line 75. Timer 72 is a standard square wave generator which generates an astable square wave control signal output from the direct current input from battery 64 by chopping the direct current input into pulses of direct current. Potentiometer 68 may then be adjusted by rotating adjusting means 58, as described above, to vary the duty cycle of timer 72. I will be further appreciated that as the duty cycle "on" time of timer 72 is varied, as described above, the positive duration of the square wave control signal pulses generated by timer 72 is correspondingly varied. As will be shortly disclosed, the amount of power conducted from battery 64 to heat blades 42, 44 is proportional to the positive duration of the square wave control signal pulses generated by timer 72. Stated differently, as potentiometer 68 is adjusted to increase the positive duration of the square wave pulses generated by timer 72, more energy from battery 64 is conducted to blades 42 and 44 with a consequent increase in the temperatures of blades 42 and 44. Such an increase is exemplified in FIG. 5 by the extended duration of the square wave pulses shown for timer output curve 77 (corresponding to a longer duty cycle) as compared to the square wave duration of timer output curve 79 (corresponding to a shorter duty cycle). Thus, as potentiometer 68 is adjusted, the duty cycle of the square wave generated by timer 72 is proportionately varied as required to raise or lower the temperature of blades 42 and 44.

The resulting square wave control signal generated by timer 72 is passed through gate 71 to oscillator 76. Oscillator 76 is in turn a standard flip-flop driver which oscillates at a frequency of approximately 20 KHz during the positive duration of the square wave control signal from timer 72. The resulting flip-flop direct current switching signal produced by oscillator 76 has a positive phase and a negative phase which are electrically conducted to field effect transistors 78 and 80, respectively. Effectively, the field effect transistors 78 and 80 then function as switches in the embodiment shown. More particularly, during the positive phase of the switching signal from oscillator 76, transistor 78 is active. Specifically, in this phase, transistor 78 completes a circuit from battery 64 to ground through the line 73 and half 81 of the primary winding 82 of center tap transformer 84. Conversely, during the negative phase of the switching signal from oscillator 76, transistor 80 completes the circuit from battery 64 to ground through line 73 and half 83 of the primary winding 82.

As will be readily appreciated by the skilled artisan, the resulting alternating current signal in primary winding 82 of transformer 84 is inductively coupled through core 96 of transformer 84 to secondary windings 86 and 88 of transformer 84. Secondary windings 86 and 88 are in turn electrically coupled with blades 42 and 44, respectively. With this coupling the electrical resistance of blades 42 and 44 causes electrical energy passing through blades 42 and 44 to be converted into heat energy, thereby heating the surfaces of blades 42 and 44 for thermally stripping wire insulation.

Also shown in FIG. 5 is a battery charging circuit 90. An alternating current or direct current charging source (not shown) is electrically connected to charging circuit 90 through charging jack 56. In the event that the charging source is an alternating current power supply, such as a 120 volt power line, (not shown), charging circuit 90 transforms the alternating current charging signal into a direct current signal to charge battery 64. It is to be appreciated that charging curcuit 90 may be external to thermal wire stripper 10 and may be useful with either alternating or direct current charging sources.

While the particular temperature-contolled thermal wire stripper as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

We claim:

1. A portable device for stripping insulation from a wire for use with a source of direct current which comprises:
   a heating element;
   means to chop direct current from said source into pulses of direct current;
   means to vary the duration of said pulses; and
   switching means for inductively coupling said direct current power to said heating element to heat said heating element in proportion to the duration of said pulses.

2. A portable device for stripping insulation from a wire for use with a source of direct current as recited in claim 1 wherein said heating element comprises two oppositely disposed metal blades.

3. A portable device for stripping insulation from a wire for use with a source of direct current as recited in claim 1 wherein said chopping means comprises a square wave generator electrically connected between said direct current power source and said heating element.

4. A portable device for stripping insulation from a wire for use with a source of direct current as recited in claim 3 wherein said variable means comprises a potentiometer electrically coupled to said square wave generator to electronically adjust the duty cycle of said square wave generator.

5. A portable device for stripping insulation from a wire for use with a source of direct current as recited in claim 1 wherein said switching means comprises a plurality of field effect transistors electrically coupled between said heating element and said square wave generator.

6. A portable device for stripping insulation from a wire for use with a source of direct current as recited in claim 5 wherein said switching means further comprises a transformer electrically connected between said transistors and said heating element.

7. A portable device for stripping insulation from a wire for use with a source of direct current as recited in claim 6 wherein said switching means further comprises an electronic oscillator responsive to said pulses electrically coupled between said square wave generator and said transistors for operating said transistors.

8. A wire insulation stripping device for use with a direct current power source which comprises:
an electrical heating element;
means for adjustably converting said direct current from said power source to pulses of direct current, said pulses having an adjustable duration; and
coupling means between said converting means and said heating element to establish an element temperature proportional to said duration of said pulses.

9. A wire insulation stripping device for use with a direct current power source as recited in claim 8 wherein said heating element comprises two oppositely disposed metal blades.

10. A wire insulation stripping device for use with a direct current power source as recited in claim 8 wherein said converting means comprises a variable duty cycle electronic square wave generator.

11. A wire insulation stripping device for use with a direct current power source as recited in claim 10 wherein said coupling means comprises a transformer electrically connected between said heating element and said converting means, an oscillator electrically connected between said converting means and said transformer to generate a flip-flop direct current signal proportional to the duty cycle of said square wave, and a plurality of field effect transistors electrically coupled between said oscillator and said transformer to switch said direct current from said power source through said transformer in response to said flip-flop direct current signal.

12. A wire insulation stripping device for use with a direct current power source as recited in claim 11 wherein said converting means further comprises a potentiometer electrically coupled to said square wave generator to electronically adjust said duty cycle of said square wave generator.

13. A method for stripping insulation from wires, comprising the steps of:
selectively chopping direct current power to pulses of direct current;
exciting an oscillator in response to the duration of said pulses to generate a flip-flop switching signal;
coupling said direct current power to an electrical heating element to heat said heating element in response to said flip-flop switching signal; and
positioning said heating element adjacent said insulation to heat said insulation for stripping said insulation from said wires.

14. A wire insulation stripping device for use with a direct current power source which comprises:
heating means;
means to convert said direct current power to an adjustable direct current pulses; and
means to couple said direct current power to said insulation heating means to establish a temperature on said wire heating means in proportion to said direct current pulses.

15. A wire insulation stripping device for use with a direct current power source as recited in claim 14 wherein said heating means comprises two metal blades.

16. A wire insulation stripping device as recited in claim 14 wherein said converting means comprises an electronic square wave generator having an adjustable duty cycle electrically connected between said direct current power source and said coupling means for generating pulses of direct current.

17. A wire insulation stripping device as recited in claim 16 wherein said converting means further comprises a potentiometer electrically coupled to said square wave generator to electronically adjust said duty cycle of said square wave generator and adjust the duration of said pulses.

18. A wire insulation stripping device as recited in claim 17 wherein said converting means further comprises an electronic oscillator electrically connected between said square wave generator and said coupling means for generating a flip-flop switching signal in response to said duration of said pulses.

19. A wire insulation stripping device as recited in claim 18 wherein said converting means further comprises a plurality of transistor switches electrically connected between said oscillator and said coupling means for electrically switching said direct current into said coupling means in response to said switching signal.

20. A wire insulation stripping device as recited in claim 19 wherein said coupling means comprises a transformer electrically connected between said converting means and said wire heating means.

21. A method for stripping insulation from a wire core, comprising the steps of:
chopping direct current power to direct current pulses;
varying the duration of said pulses;
generating a flip-flop switching signal in response to said pulses;
coupling said direct current power to a stripping blade to heat said blade in response to said switching signal;
positioning said stripping blade adjacent said insulation to partially melt said insulation; and stripping said partially melted insulation from said wire.

22. A method for stripping insulation from a wire core as recited in claim 21 wherein said chopping and varying steps are accomplished by interconnecting an electrical timer between said stripping blade and said direct current power and varying the duty cycle of said timer.

23. A method for stripping insulation from a wire core as recited in claim 22 wherein said flip-flop generating step is accomplished by interconnecting an electronic oscillator between said timer and said stripping blade.

24. A method for stripping insulation from wire core as recited in claim 23 wherein said coupling step is accomplished by interconnecting an electrical transformer between said oscillator and said stripping blade.

25. A method for stripping insulation from a wire core as recited in claim 24 wherein said coupling step is further accomplished by interconnecting a plurality of field effect transistors between said oscillator and said stripping blade for switching said direct current power through said transformer in response to said flip-flop signal.

26. A method for stripping insulation from wire core as recited in claim 25 wherein said stripping step is accomplished using a plurality of stripping blades.

* * * * *